Jan. 14, 1936.  A. E. CLAWSON  2,027,959
HYGROMETRIC APPARATUS
Filed Oct. 10, 1931
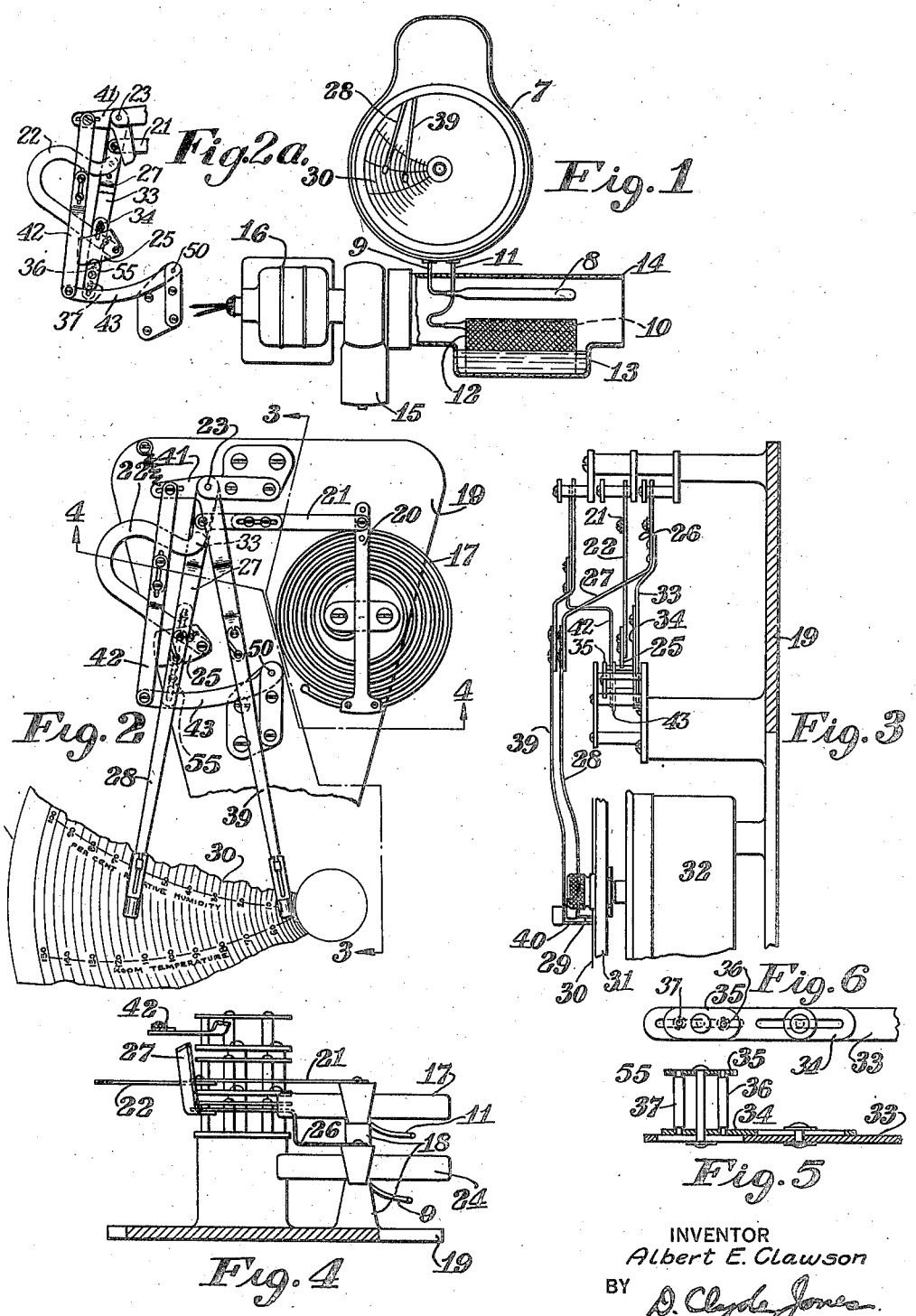
INVENTOR
Albert E. Clawson
BY
ATTORNEY Patented Jan. 14, 1936

2,027,959

UNITED STATES PATENT OFFICE 2,027,959

HYGROMETRIC APPARATUS

Albert E. Clawson, Springfield, Pa., assignor to Taylor Instrument Companies, Rochester, N. Y., a corporation of New York Application October 10, 1931, Serial No. 568,125

4 Claims. (Cl. 73—24)

This invention relates to a device for indicating and recording humidity, and more particularly to a direct reading humidity indicator and recorder of the type known in the art as a psychrometer.

Devices of this type have been produced in the past, but they have been so complicated mechanically or else the degree of accuracy was so unsatisfactory that they have not gone into wide use. The main feature of the present invention, therefore, relates to a direct reading humidity indicator and recorder giving a relatively high degree of accuracy and which is so simple, that it can be readily manufactured and can be made to operate satisfactorily with a minimum amount of attention.

Referring to the drawing, Fig. 1 is a front view of a humidity indicator and recorder of the present invention; Fig. 2 is a plan view of the operating mechanism normally enclosed within the casing of Fig. 1; Fig. 3 is a sectional view of the operating mechanism taken on line 3—3 of Fig. 2 looking in the direction of the arrows; Fig. 4 is a sectional view of the operating mechanism taken on the line 4—4 of Fig. 2 looking in the direction of the arrows; and Figs. 5 and 6 are respectively a side elevation and a plan view of a so-called cage for mounting one of the elements employed in the device.

From Fig. 1, it will be noted that the device includes a dry bulb thermometer with its bulb indicated at 8 and with its capillary tube 9 connected to actuating mechanism within the casing 7. There is also provided a wet bulb thermometer having a bulb such as 10 connected by a capillary tube 11 to operating mechanism also included within the casing. It will be seen that the wet bulb thermometer is covered by wicking 12 or other absorbent material, dipping into a reservoir 13 which normally contains a liquid such as water. The bulbs 8 and 10 are enclosed within a tubular passage 14 through which air may be drawn by a suction fan 15 driven by a suitable electric motor 16. The capillary tube 11 of the wet bulb thermometer is connected to a Bourdon spring 17 (Figs. 2 and 4), mounted on a suitable standard 18 attached to the back 19 of the instrument. This spring is connected by links 20 and 21 to a curved arm 22 pivoted at 23, which arm at its free end is provided with a cam plate 25. This plate is adjustably mounted on the end of the curved arm, so that the plate may be adjusted and then locked in position. The dry bulb 8 is connected by its capillary tube 9 to a Bourdon spring 24 which, as shown in Fig. 4, is likewise mounted on the support 18 directly beneath the Bourdon spring 17. The free end of the Bourdon spring 24 is connected by a link 26 to an arm 27 on which there is mounted the stylus arm 28. This arm is provided with stylus 29 engaging a graduated chart 30 to give the dry thermometer indication. This chart is detachably mounted on a disk 31 which may be rotated by clock mechanism 32, so that the chart makes one complete revolution in a predetermined interval of time. The arm 27 is provided with an extension arm 33 having slidably mounted thereon for radial movement a cage generally designated 55, including the lower plate 34 and an upper plate 35 in which plates the rollers 36 and 37 are adapted to rotate. On the same center as the dry thermometer stylus arm 28, there is mounted a second stylus arm 39 provided with a stylus 40 to engage the chart 30. Stylus arm 39 is also provided with a bell crank arm 41, at the free end of which there is connected a link 42. The link 42 is pivotally connected at its other end to the curved arm 43 pivoted at 50 with which arm the roller 37 of the cage is adapted to engage, at the same time that the roller 36 of this cage is engaging the surface of the cam plate 25. It should be noted that the inner or bearing surface of curved arm 43 is a segment of a circle having its center at pivot 23, and that this surface of the arm is held in contact with roller 37 of the cage by reason of the fact that the arm is connected by link 42 to bell crank arm 41 which is tensioned by a spring to move clockwise.

The operation of the device is as follows:

When the wet bulb 10 is thoroughly moistened with water supplied from the reservoir 13 through the wick 12, motor 16 is started to rotate the suction fan 15. This fan then draws a current of air through the passage-way 14 following the well-known practice, so that the wet bulb 10 through its capillary tube 11 causes the Bourdon spring 17 to respond in accordance with the wet bulb temperature. In response to the operation of the Bourdon spring 17, the links 20 and 21 actuate the curved arm 22 causing it to position its attached cam plate to determine the movement in a radial direction of the cage 55 by reason of its roller 36 engaging the edge of the cam plate. While these operations are taking place, the bulb 8 of the dry bulb thermometer through its capillary tube 9 actuates its Bourdon spring 24 causing this spring to assume a position corresponding to the dry bulb thermometer temperature. The spring 24 through its arm 26 actuates stylus arm 28 causing stylus 29 to mark a continuous dry bulb temperature reading on the chart 30. As the dry bulb stylus arm rotates in response to temperature changes, it carries with it cage 55 of which the roller 36 bears against the cam plate and the roller 37 engages the inner curved surface of the arm 43. It will thus be seen that since the arm 22 actuated by wet bulb 10 assumes one position in accordance with the wet bulb temperature, and since the arm 33 attached to the dry bulb stylus arm 28 assumes a different position in accordance with the temperature indicated by the dry bulb 8, the curved arm 43 will be jointly operated by these two arms. Then as the curved arm 43 is thus moved, the link 42 causes a corresponding movement of the stylus arm 39 by means of its connection with the bell crank arm 41. It will be understood that the instrument is calibrated so that the stylus arm 39 records the percentage of relative humidity on the chart at the same time that the stylus arm 28 is recording the normal temperature to which the instrument is exposed.

Curved arm 43, which cooperates with the cage, is so designed that the movement of the arm 39 is directly proportional to the difference between the wet bulb and the dry bulb indications and inversely proportional to the dry bulb indication taken from an arbitrary zero position. The movement of the arm 39 is similar to the movement of the free end of the curved arm 43, except that the movement of the curved arm is multiplied by the link 42 and the bell crank arm 41.

In understanding the principle of the hygrometer of the present invention, it should be pointed out that it is so designed as a result of the following calculations, observations and deductions, that the indication of relative humidity is effected by the change in relative humidity when the reference point of the humidity indicator 39 is taken as 100% relative humidity on the scale. If the relative humidity is lower than 100%, the motion of the wet bulb arm 22 causes the humidity indicator 39 to move.

The relative humidity varies directly as a constant (herein assumed to be 100% humidity) minus the ratio of the dry bulb temperature depression (i. e. the difference between the dry bulb temperature and the wet bulb temperature) to that of the dry bulb temperature, or otherwise expressed as:

$$\text{Relative Humidity} \sim 100\% - \frac{\text{Dry bulb temp.} - \text{Wet bulb temp.}}{\text{Dry bulb temperature}}$$

Hence the humidity indicated is equal to 100% relative humidity minus the motion of the pointer 39, which is due to the change in humidity. It is very seldom that 100% relative humidity is reached; therefore, the humidity registration may be considered as obtained by successive motion of the pointer from 100% relative humidity. Calling the successive changes in relative humidity A1, A2, etc., the relative humidity registered at any moment would be: 100%−A1−A2 etc. If a relation for the changes in relative humidity is found, the relative humidity is immediately given.

Now the change in relative humidity as shown by the motion of the pointer may be expressed as:

$$A = \frac{B}{\text{Dry Bulb Temp.} + (C)} \quad \text{Equation}$$

A is the change in relative humidity.

B is a constant for a particular dry bulb depression.

C is a constant, or the arbitrary zero (herein assumed to be −7° F.).

The above relationship (equation) can be substantiated from the following psychrometric data:

Table I

| Dry bulb or air temperature °F. | Temperature depression °F. | Percent relative humidity | Change in relative humidity or movement of stylus 39 |
|---|---|---|---|
| 60 | 0 | 100 | 0 |
|  | 5 | 73 | 27 |
|  | 10 | 49 | 24 |
|  | 15 | 27 | 22 |
| 80 | 0 | 100 | 0 |
|  | 5 | 79 | 21 |
|  | 10 | 61 | 18 |
|  | 15 | 44 | 17 |
|  | 20 | 29 | 15 |
| 100 | 0 | 100 | 0 |
|  | 5 | 83 | 17 |
|  | 10 | 68 | 15 |
|  | 15 | 54 | 14 |
|  | 20 | 42 | 12 |

It should be noted in Table I that the changes of relative humidity form substantially fixed ratios for succeeding steps in temperature depression at all dry bulb temperatures, hence motion of the cage 55 over the cam plate 25 will afford the proper motion at all dry bulb temperatures although the cam shape was determined for any particular temperature with varying temperature depressions.

Table II, which follows, is derived directly from Table I, and relates specifically to the equation above:

Table II

| Dry bulb temperature | Change in temperature depression | Change in relative humidity |
|---|---|---|
| 60° F | 5° F.→15° F. | 46% |
| 80° F | 5° F.→15° F. | 35% |
| 100° F | 5° F.→15° F. | 29% |

It has been analytically determined that the best position for pivot 50 of lever or curved arm 43 corresponds to a reading of the dry bulb temperature of −7° F. Constant "C" in (equation) is therefore −7° F. According to (equation) change in relative humidity × (dry bulb temperature +C) =a constant. Taking the above values in Table II, this is found to be substantially correct as follows:

at 60° F. 67×46=3080
at 80° F. 87×35=3040
at 100° F. 107×29=3100

The above shows that for a given temperature depression the motion of lever or curved arm 43 is such that the proper relative humidity indication is obtained at any dry bulb temperature.

The foregoing deductions show:

1. The cam plate 25, although designed for obtaining proper motion for different relative humidities at a particular dry bulb temperature, will give the proper motion at all dry bulb temperatures.

2. The lever or curved arm 43, when properly positioned transmits motion from the cage engaging the cam plate, so that for a fixed temperature depression the proper humidity indication is obtained at all dry bulb temperatures.

I claim:

1. In apparatus of the class described, a dry element temperature-responsive device and a wet element temperature-responsive device, a cam plate rotatively actuated by one of said devices, a member rotatively actuated by the other of said devices and radially by said cam plate, an arm provided with a curved surface engaging said member, said arm being pivoted at one end for limited rotary movement under the control of said member, and indicating means actuated by said arm.

2. In apparatus of the class described, a dry element temperature-responsive device and a wet element temperature-responsive device, a cam plate rotatively actuated by said wet element responsive device, a member rotatively actuated by said dry element responsive device and radially by said cam plate, an arm provided with a curved surface engaging said member, said arm being pivoted at one of its ends for actuation by said member, and an indicating element linked to its other end.

3. In apparatus of the class described, a dry bulb temperature-responsive device and a wet bulb temperature-responsive device, a cam plate rotatively actuated by said dry bulb responsive device, a member rotatively actuated by said dry bulb responsive device and radially by said cam plate, a curved arm provided with a curved surface and pivoted at its end, said arm arranged to have its curved surface engaged by said member, an indicating element including a pivoted bell crank lever and an indicator attached to one arm thereof, and a link connecting the free end of said curved arm and the other arm of said bell crank arm.

4. In apparatus of the class described, a dry element temperature-responsive device, a wet element temperature-responsive device, a pivoted arm provided with a cam plate and arranged to be actuated by said wet element responsive device, a second arm pivoted on an axis common to said first arm, said second arm being actuated by said dry element responsive device, a member mounted for rotation by said second arm and for radial movement by said cam plate, an arm having a surface curved with respect to said axis, said arm being pivoted at one end and being held with its curved surface in engagement with said member, and an indicating member actuated by the other end of said arm.

ALBERT E. CLAWSON.